United States Patent [19]

Bretone, Jr.

[11] 4,155,572
[45] May 22, 1979

[54] NIPPLE STRUCTURE FOR PIPING INSTALLATIONS

[76] Inventor: John Bretone, Jr., 91 Woodview Rd., West Hempstead, N.Y. 11552

[21] Appl. No.: 679,780

[22] Filed: Apr. 23, 1976

Related U.S. Application Data

[62] Division of Ser. No. 610,863, Sep. 5, 1975, Pat. No. 4,038,737.

[51] Int. Cl.² .......................... F16L 5/00; F16L 41/00
[52] U.S. Cl. ...................................... 285/197; 285/15; 285/236
[58] Field of Search .......................... 29/401 F; 4/211; 285/236, 189, 197, 57, 15, 284, 197

[56] References Cited

U.S. PATENT DOCUMENTS

| 3,214,199 | 10/1965 | Brooks | 285/284 X |
| 3,649,055 | 3/1972 | Nilsen | 285/197 |
| 3,796,445 | 3/1974 | Strott | 285/197 X |
| 3,823,250 | 7/1974 | DeMonsy et al. | 285/197 X |
| 3,856,208 | 12/1974 | Naftaly | 285/197 X |

FOREIGN PATENT DOCUMENTS

| 625461 | 8/1961 | Canada | 285/197 |
| 1049527 | 11/1966 | United Kingdom | 285/197 |

Primary Examiner—Charlie T. Moon
Attorney, Agent, or Firm—Lerner, David, Littenberg & Samuel

[57] ABSTRACT

A nipple which may be inserted into one pipe for attaching another pipe intermediate ends of the one pipe. A shield extends about the nipple and conforms to the outside of the one pipe to aid in adhesively sealing the nipple thereto.

7 Claims, 6 Drawing Figures

NIPPLE STRUCTURE FOR PIPING INSTALLATIONS

This is a division of application Ser. No. 610,863, filed Sept. 5, 1975, now U.S. Pat. No. 4,038,737.

BACKGROUND OF THE INVENTION

Typical toilet plumbing has a lead (Pb) pipe which extends downwardly from the bowl of the toilet into the space between the floor supporting the toilet and the ceiling of the room beneath the toilet. The lead pipe curves in this space about 90° for joining with a ferrule by a wiped solder joint. The ferrule is usually sealed to a TY section of a soil stack with a caulked lead (Pb) and oakum joint. Occasionally the lead (Pb) pipe may extend between the toilet and the ferrule without bending about 90° as, for example, when a toilet is installed in a cellar and directly connected to a sewer beneath the cellar.

The soil stack and TY section are usually made from a thick cast iron. The ferrule is usually made from a thick brass. The pipe from the toilet to the ferrule, however, is often made from lead (Pb); this pipe, therefore, is often the portion of the plumbing for the toilet which first deteriorates and leaks.

Installing the lead (Pb) pipe for toilets in new construction has required both considerable effort and careful scheduling relative to completion of other portions of the structure to make the installation most easily. The oakum must first be packed between the ferrule and the TY section and then lead, heated to approximately 700° F. (370° C.), poured over the oakum between the ferrule and the TY section. Caulking of the cooled lead joint with special chisels then completes the seal between the ferrule and TY section. The other end of the ferrule has been previously fitted to the lead (Pb) pipe with a sealing bead of solder wiped about the fitted joint. The pipe usually curves upwardly from the joint through a floor built above the lead pipe for supporting the toilet. A flange is then secured to the end of the lead (Pb) pipe at the floor and the flange secured to the toilet. The flange may also be secured to the floor with fasteners.

The ceiling of a room beneath the toilet may then be installed. The ceiling cannot be installed until the plumbing for the toilet has been completed because the limited space between the floor which supports the toilet and the ceiling of the room beneath the toilet usually does not provide enough space for making the caulked lead (Pb) and oakum joint used in installing the toilet. Thus, even in new construction, installing a toilet has required both difficult-to-make caulked oakum and lead (Pb) and solder joints as well as scheduling of the construction to first complete the plumbing for the toilet and then finish the floor which supports the toilet and the ceiling of the room below the toilet.

When the pipe from a toilet springs a leak, it must, of course, be replaced. Replacing a lead (Pb) pipe, like initially installing the lead (Pb) pipe, has been a difficult operation. The toilet must first be removed from the flange on the pipe. A hole is then cut in the floor which supported the toilet to provide access to the leaking pipe. The leaking lead (Pb) pipe is then cut off, usually with a reciprocating saw. The caulked oakum and lead joint must also be removed, a process which usually requires that the ferrule be removed with a hammer and chisel. If the hammering and chiseling damages the TY section of the soil stack which, usually being cast iron, can crack and cannot be repaired, a major reconstruction job of replacing the TY section of the soil stack becomes necessary.

Even if the old ferrule is successfully removed from the TY section of the soil stack without damage, a new ferrule must then be installed. Installing the new ferrule requires inserting a new oakum packing, pouring molten lead about the oakum, and then caulking the molten lead to again form a permanent seal between the ferrule and the TY section of the soil stack. The new lead (Pb) pipe must also be connected to the new ferrule with a wiped solder joint.

The limited space between the floor which supports the toilet and the ceiling of the room beneath the toilet usually prevents properly forming the caulked oakum and lead joint between the TY section of the soil stack and the ferrule without opening the ceiling of the room beneath the toilet as well as the floor which supports the toilet. Both the floor and ceiling must then be replaced thereby to make quite expensive the installation of the new lead (Pb) pipe. In addition, the old ferrule was probably in satisfactory condition (because of its heavy construction) even though the lead (Pb) pipe has sprung a leak. Replacing the old, but satisfactory ferrule with a new ferrule then wastefully requires supplying the new ferrule. Of course, proper tools, including equipment for heating the new molten lead (Pb) joint to approximately 700° F. (370° C.), are also needed.

Although it would seem that an easier way of replacing the leaking lead (Pb) pipe would be to separate the old pipe from the ferrule at the wiped solder joint between the two and then connecting a new lead (Pb) pipe to the old ferrule with a new wiped solder joint, the wiped solder joint cannot be formed satisfactorily while the ferrule is connected to the TY section of the soil stack. Even if a way of properly forming the solder joint between the pipe and ferrule while the ferrule is connected to the TY section of the soil stack were found, forming such a joint would still be likely to require removing the ceiling of the room beneath the toilet as well as the floor which supports the toilet to provide adequate room for forming the solder joint. The additional expense of replacing the ceiling as well as the floor will thus still be required.

In recent years polyvinyl chloride (hereinafter PVC) plumbing pipes have become available. Such PVC pipes, however, have not been available long enough to have been used in a significant portion of toilet installations in this country. In addition, after the recent introduction of PVC pipes, their use was resisted until the satisfactory performance of such pipes could be demonstrated and local building codes then changed to permit their use. PVC pipes are thus not likely to be found in even relatively recent structures and are even less likely to be found in structures which are old enough for a lead (Pb) pipe to have deteriorated sufficiently to leak. Most toilets are thus connected to a cast iron soil stack by a lead (Pb) pipe and brass ferrule as described above.

Another recent development are pipe couplings formed from an elastomer such as neoprene. These couplings are compressible sleeves which extend over facing ends of pipes. Ring clamps which extend about the portions of the sleeve overlapping each pipe are then tightened to compress the sleeve about the pipes and thereby seal the coupling between the ends of the pipes. It is known, for example, to use such couplings for underground waste pipes. Such couplings, however, have not heretofore been used for installing or replacing the discharge pipes from toilets.

Compressible sleeve couplings are necessarily flexible in order to be compressed about ends of pipes connected with the coupling. This flexibility permits the coupling to bend. The coupled pipes therefore must be otherwise supported. When the couplings are used with underground pipes, the ground supports the pipes. If, however, such couplings were used for plumbing, the pipes of the plumbing would have to be connected to the structure for support. Metal plumbing pipes require only limited connections to the structure for support as compared to the additional connections to the structure which would be required if flexible sleeve couplings connected the pipes. The additional expense of such additional connections would largely negate the saving in cost over conventional pipe couplings which could be obtained from the use of sleeve couplings.

The support for pipes which are joined by a flexible, compressible sleeve not only must be adequate to support the pipes when they are installed, but also adequate to keep the pipes from shifting or sagging over the years after they are installed. Keeping the pipes from moving is particularly important when one of the pipes joined by a sleeve is the discharge pipe from a toilet because movement of the discharge pipe relative to the toilet could cause a leak between the toilet and pipe which, because the toilet covers the discharge pipe, could not be detected until the leak had caused noticable damage to the structure about the toilet.

It is also sometimes desirable to connect one plumbing pipe to another intermediate ends of the other pipe. With metal plumbing pipes, such connections were usually made by cutting a section from the other pipe and inserting a Y or T-shaped coupling in place of the section removed from the pipe. These couplings have an extra fitting to which the end of the one pipe then connected. Such a connection thus effectively requires the installation of three pipes and a coupling to make two flow paths through the pipes.

SUMMARY OF THE INVENTION

One object of the invention is to provide a method for more easily installing or, particularly, replacing the discharge pipe from a toilet. Another object of the invention is to provide an improved way of supporting a discharge pipe beneath a toilet which, additionally, cooperates with and overcomes a problem particularly presented by installations according to the method. Still another object of the invention is to provide apparatus for connecting one pipe to another intermediate the ends of the other pipe, which apparatus particularly cooperates with a preferred form of a discharge pipe used in the method.

The method of installing or replacing a discharge pipe from a toilet first obtains access to the space for the pipe. Access is usually obtained by forming an opening either by leaving incomplete a portion of a floor of a new structure at the location for the toilet or by removing the toilet and a portion of the floor therebeneath in an existing structure in which it is desired to replace the discharge pipe.

The method next forms a ferrule structure which extends from and communicates with a TY section of a soil stack or similar portion of a sewage system. If the toilet is being first installed, a ferrule-like member may be installed in and sealed to the TY section of the soil stack in the conventional way with an oakum packing, molten lead, and caulking. Alternatively, the ferrule-like member may be formed from PVC and adhesively sealed to the TY section. The ferrule-like member differs from a conventional ferrule by having a bead about the end which projects from TY section of the soil stack. The ferrule-like member thus resembles the member which is formed in replacing a lead (Pb) pipe from a toilet when the lead (Pb) pipe is cut from a ferrule at the wiped solder joint which usually connects the pipe to the ferrule with the wiped solder and possibly a short portion of the lead (Pb) pipe inside the solder left on the end of the ferrule. In both installing or replacing a discharge pipe, this step of the method can thus be described as forming a ferrule structure (the ferrule and solder or ferrule-like member) which is sealed to the TY section of a soil stack at one end and has a bead at its other end.

The method then connects one end of a discharge pipe to the ferrule structure with a compressible sleeve. Ring clamps extend about portions of the sleeve which extend over facing ends of the ferrule structure and the discharge pipe, the ring clamp around the portion of the sleeve over the ferrule structure being between the bead and the TY section of the soil pipe, i.e., the side of the bead away from the discharge pipe. The ring clamps are then tightened to compress the sleeve onto the ferrule structure and the discharge pipe for sealing the ferrule structure to the pipe with the sleeve.

Inasmuch as the sleeve is necessarily flexible in order to be compressed about the ferrule structure and discharge pipe, the sleeve provides limited support for the discharge pipe. To make the discharge pipe as light as possible for the best support by the sleeve, and to take advantage of its lower cost and other desirable properties, the discharge pipe for practicing the method is preferably a plastic such as PVC. The discharge pipe also preferably projects into the ferrule structure for further support and to adjust the length of the pipe between the ferrule structure and the toilet without stocking and selecting a pipe of the length required for each toilet installation.

An end of the discharge pipe remote from the ferrule structure projects through a floor. A flange is attached to this end for connection to a toilet placed on the floor.

Where the toilet is being installed in a new structure, the floor, which is formed in whatever manner is desired, has usually been left incomplete to provide an access opening for installing the discharge pipe. Where the discharge pipe in an existing structure is being replaced, a portion of the floor about the toilet usually has been removed to provide the access opening for replacing the pipe. This portion of the floor is then replaced. Often, it is replaced by casting a floor section to fill an irregular opening which has been made in the floor. The toilet is then placed on the floor and connected to the flange to complete the method of installing or replacing the discharge pipe.

The method is obviously far easier, less expensive, and therefore more desirable than the conventional way of replacing a discharge pipe from a toilet in which not only the defective pipe but also the ferrule are removed. Removing the ferrule requires hammering and chiseling the ferrule from the TY section of the soil stack to break the caulked oakum and lead seal therebetween. Hammering and chiseling the ferrule presents some danger of damaging the TY section of the soil stack. Such damage requires great effort and expense to repair.

If the TY section of the soil stack is damaged, the wall behind the toilet has to be opened to provide access to the soil stack. The damaged section is then removed while supporting a portion of the soil stack which extends above the TY section either for connection to toilets or other plumbing above the toilet for which it was desired to change the discharge pipe or for providing a vent for the soil stack. Only then can the damaged TY section be replaced. Even if substantial care and experience can minimize the risk of damaging the TY section of the soil stack while removing the ferrule, the extraordinarily great effort and expense required to replace a damaged TY section makes even this minimum risk unacceptable.

It will be appreciated that the problems of installing the lead pipes in a structure under construction include the separate installation of each piece after the soil stack or sewage system is installed. This requires lead melting equipment and special tools at each installation site. Furthermore, because of the soft lead structure of the pipe, it can be easily damaged after installation. It requires the same procedure to replace the lead pipe in a structure under construction as replacing the lead pipe in an existing structure.

The discharge pipe will have a separate flange which will attach, preferably adhesively, to the discharge pipe directly below the toilet bowl. The flange preferably includes ears projecting outwardly from its circumference. The ears are secured to the floor for supporting the discharge pipe therefrom. For example, when a discharge pipe is replaced and, as often is the case, the opening made in the floor beneath the toilet to provide access to the pipe is replaced with a cast floor portion, the ears of the flange may extend into the cast floor portion to directly secure the discharge pipe to the floor. Alternatively, the top of the flange may be secured to the floor with conventional fasteners.

The flange having ears for supporting the discharge pipe from the floor particularly cooperates with the method of the invention because the ears provide support for the discharge pipe in compensation for the somewhat diminished support of the pipe produced by the necessarily flexibly, compressible sleeve with which the pipe is connected to the ferrule structure as compared to the support for a lead (Pb) discharge pipe achieved when the lead (Pb) pipe is soldered to a ferrule according to the conventional way of installing a lead (Pb) pipe. Supporting the discharge pipe from the floor beneath the toilet with the ears on the flange also cooperates with the method of the invention by taking advantage of the somewhat flexible sleeve coupling the pipe and the ferrule structure. Limited relative shifting or settling between the floor supporting the toilet and the soil stack, ferrule structure and discharge pipe is accommodated by flexure of the sleeve, the toilet and the end of the discharge pipe secured to the floor by the flange shifting with the floor to thereby maintain the seal between the discharge pipe and the toilet supported on the floor.

Other apparatus, which is also particularly useful in the preferred practice of the method, comprises a nipple. The nipple is adapted to be inserted into one pipe for connecting an end of another pipe to the one pipe intermediate its ends. For example, it is sometimes desired to connect the drain for a washstand to the discharge pipe for an adjacent toilet rather than making a separate connection to the soil stack for the washstand. This example of the use of the nipple and, indeed, any use with a discharge pipe, are merely exemplary of the use of the nipple for connecting one pipe intermediate the ends of another.

The nipple has a portion which projects from the side of the pipe on which the nipple is mounted. The projecting portion is adapted for receiving the end of a pipe. For example, this portion of the nipple may be formed as a male or female threaded connector. Another, stub portion of the nipple snugly fits into a bore through the side of the pipe on which the nipple is mounted. The stub portion of the nipple preferably is as long as the wall of the pipe is thick so that the end of the stub portion of the nipple is flush with the interior surface of the pipe. A shield is positioned between the projecting and stub portions of the nipple and extends radially beyond these portions.

The shield conforms to the exterior cross section of the pipe on which the nipple is mounted. For example, the shield may have a radius of curvature which substantially corresponds to the outside radius of curvature of a pipe of round cross section. In an alternative example, the shield is flexible for conforming to various cross sections.

The shield is adhesively secured to the side of the pipe to seal the nipple to the pipe. Because the shield extends beyond the other portions of the nipple, it has a surface providing a larger area of engagement with the side of the pipe to which it conforms than these other portions would provide. This larger area permits better adhesive attachment and consequent sealing of the nipple to the pipe than could be obtained by adhesive attachment of merely the stub and outside portions of the nipple to the pipe. Neither of these portions then has to be unnecessarily large just to aid adhesive attachment of the nipple.

DESCRIPTION OF THE DRAWINGS

The preferred practice of the method and preferred embodiments useful for and cooperative with the preferred practice of the method will now be described with reference to drawings in which.

DESCRIPTION OF THE PREFERRED PRACTICE OF THE METHOD AND PREFERRED EMBODIMENTS FOR USE IN COOPERATION WITH THE METHOD

Figure 1:
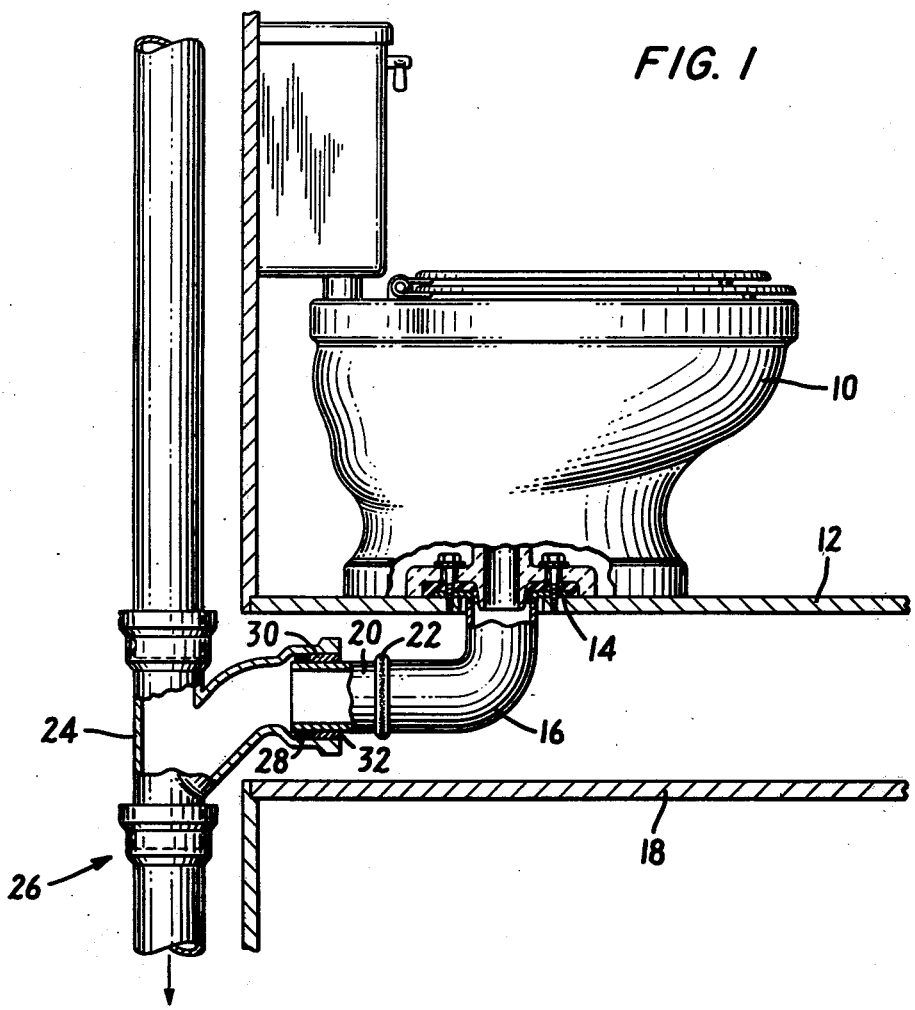
FIG. 1 is a schematic elevation, partly in section, of a typical toilet installation in which it is desired to replace a lead (Pb) discharge pipe from the toilet.

FIG. 1 illustrates a typical toilet installation in an existing, completed building. A toilet 10 is supported on a floor 12. The bottom of the toilet is connected and sealed to a flange 14 of a lead (Pb) discharge pipe 16.

Although the discharge pipe is sometimes straight, most often the pipe has an approximately 90° bend from a vertical section which extends downwardly from the toilet to an essentially horizontal section for accommodating the discharge pipe in the space between the floor 12 and a ceiling 18 of a room beneath a toilet. Such lead (Pb) discharge pipes are sometimes called lead (Pb) bends.

An end of lead (Pb) pipe 16 remote from the toilet is connected to a ferrule 20 by a wiped solder joint 22. The wiped solder joint forms a bead about facing ends of the pipe and ferrule.

The other end of the ferrule is connected to and sealed in an opening in a TY section 24 of a soil stack at 26. An oakum packing 28 and lead 30 caulked at 32 form the seal between the ferrule and the TY section. The oakum packing 28 is at an end of the seal innermost of the TY section 24. The layer of lead 30 is formed by pouring molten lead about the oakum packing and the outer edge of the cooled molten lead is caulked at 32.

Experience has shown that this substantial caulked oakum and lead seal is required to form a fluid and gas tight seal between the ferrule and the TY section in the corrosive environment of toilet effluent and sewer gas. Experience has also developed the common practice of forming the TY section 24 and soil stack 26 of relatively thick cast iron and the ferrule 20 of relatively thick brass to also resist the corrosive environment. The pipe 16, however, is often formed of lead (Pb). It is subject to abrasion by the effluent at the approximately 90° bend in the pipe and corrosion by residue of the effluent which reaches the pipe before it reaches the ferrule or soil stack. For these and other reasons the lead (Pb) pipe often deteriorates and leaks while the ferrule and soil stack are substantially undeteriorated. The lead (Pb) pipe must then be replaced, but there is not inherent reason for replacing the ferrule and soil stack.

Unfortunately, however, the wiped solder joint required for sealing a replacement lead (Pb) pipe to the ferrule cannot be replaced while the ferrule is sealed to the TY section 24 of the soil stack. The ferrule 20 thus heretofore has had to be removed from the TY section (often with hammer and chisel), a replacement ferrule connected to the replacement lead (Pb) pipe, and the new ferrule and lead (Pb) pipe then connected to the TY section. The process of removing the ferrule from the TY section is particularly onerous and presents some risk of damaging the TY section which the necessitates a major undertaking to replace the damaged TY section. In addition, to replace the ferrule, it was often necessary to open the ceiling 18 to gain access for sealing the ferrule to the TY section 24 with the caulked oakum and lead joint.

Figure 2:
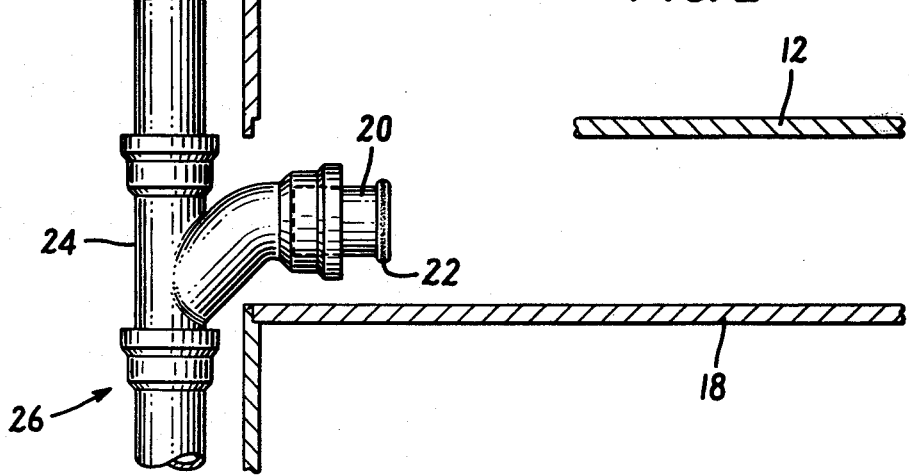
FIG. 2 is an elevation of the installation shown in FIG. 1 after portions thereof have been removed according to the method.

FIG. 2 illustrates the practice of the method in replacing the discharge pipe 16. Access to the discharge pipe has been obtained by removing the toilet and forming an opening in the floor 12. The lead discharge pipe 16 is then removed while leaving the bead formed by the solder joint 22 on an end of the ferrule 20, with possibly a portion (not shown) of the lead (Pb) pipe 16 within the solder bead 22. With the solder 22 on the ferrule 20, the solder and ferrule form the ferrule structure used in the method.

For example, the lead (Pb) pipe 16 may have been removed by cutting the pipe with a reciprocating saw immediately adjacent the solder 22. The seal between the ferrule 20 and the TY section 24 is thus undisturbed and no opening in the ceiling 18 is required to gain access for replacing this seal.

Figure 3:
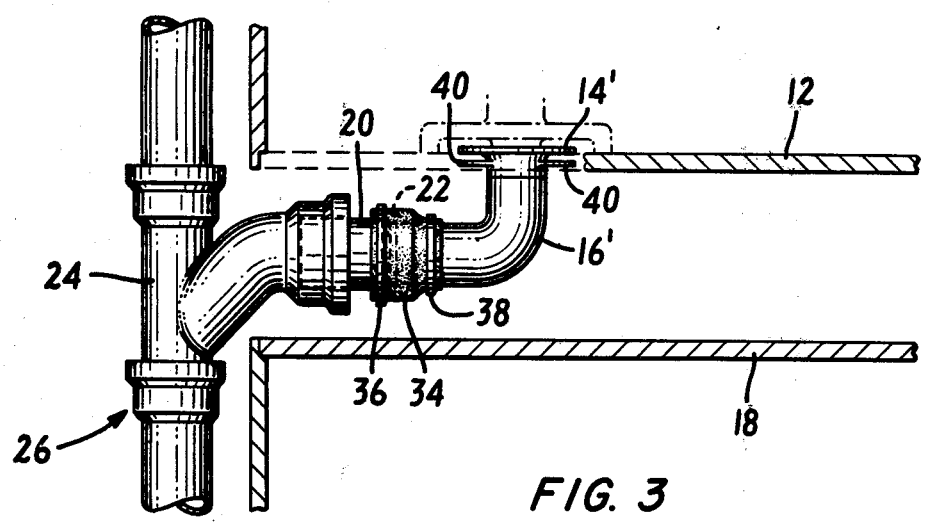
FIG. 3 is an elevation of the installation shown in FIG. 2 after the discharge pipe has been replaced according to the method.
Figure 4:
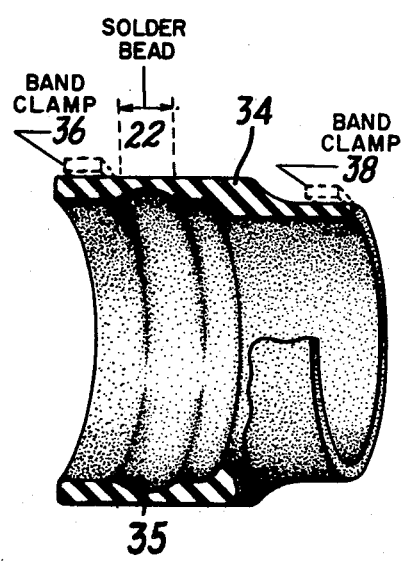
FIG. 4 is a three dimensional view, partly cut away, of a portion of a preferred embodiment for practicing the method as shown in FIG. 3.

FIG. 3 shows a new, replacement discharge pipe 16' connected to the ferrule structure 20, 22. A compressible sleeve 32 extends about facing ends of the pipe 16' and ferrule structure. This end of the pipe 16' preferably has an external diameter slightly smaller than the internal diameter of the ferrule so that the end of the pipe preferably, but not necessarily, extends into the ferrule for supporting the pipe with the ferrule and adjusting the length of the pipe extending to the toilet. The pipe 16' is also preferably formed of PVC for, inter alia, being light and easily supported.

The sleeve 34 is compressible and thus somewhat flexible to provide only limited support to the pipe 16'. For example, the sleeve 34 may be formed of neoprene. Ring clamps 36, 38 extend about the sleeve at portions which extend over the ferrule 20 and the pipe 16', respectively. The ring clamps are tightened about the sleeve to compress portions of the sleeve into sealing engagement with the ferrule and the pipe 16'. The ring clamps may be of any convenient type, one type of such clamps being formed from a slotted stainless steel band with the thread of a screw which is rotatably connected to the band extending into the slots for advancing the band past the screw as the screw is rotated.

The ring clamp 36 is positioned over a portion of the ferrule which extends between the solder bead 22 and the TY section 24. Preferably it is adjacent the solder bead 22 for additionally compressing a channel 35 on the sleeve 34 into sealing engagement with the solder bead 22. The solder bead 22 then cooperatively assists in sealing the sleeve to the ferrule. Particularly when the pipe 16' is formed of PVC, additional sealing means (not shown), like solder bead 22, are not necessary to achieve a satisfactory seal between the sleeve and the pipe, but may be provided.

The end of the pipe 16' remote from the end within the ferrule 20 is attached, as by adhesive, to a flange 14' which, like the flange 14 (FIG. 1), will be connected and sealed to the toilet 10 (FIG. 1) after the portion of the floor about the pipe 16' (which was removed for achieving access to the pipe) is replaced. The method as thus described is complete.

FIG. 3, however, also illustrates an additional feature of a preferred embodiment for the preferred practice of the method. The flange 14' preferably has ears 40, two of which are shown merely by way of example. The ears 40 extend from the flange 14' in a position for securing the flange (and thus the discharge pipe) to the portion of the floor (shown in phantom) which is replaced after replacing the pipe. This portion of the floor is often replaced by casting a flooring section. The ears 40 are then cast within the portion of the floor to secure directly and support the pipe 16' from the cast floor portion.

Figure 5:
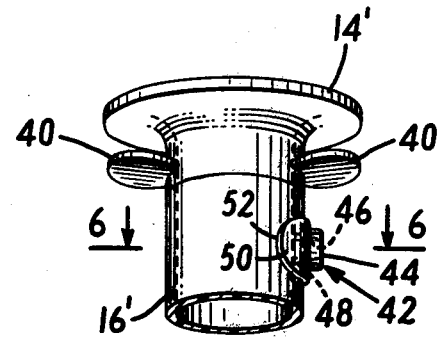
FIG. 5 is a three dimensional view of another portion of the preferred embodiment for practicing the method, the view being rotated from the position shown in FIG. 3.

FIG. 5 is enlarged relative to FIG. 3 to better show the ears 40. FIG. 5 is also rotated from FIG. 3 to show an embodiment of a nipple 42 which may cooperate with the preferred PVC discharge pipe used in the method for connecting an end to another pipe (not shown) to the pipe 16' intermediate ends of the pipe 16'.

The nipple at 42 has a portion 44 which projects outside the pipe 16' and is adapted for connection to an end of the other pipe. A passage 46 for a flow path extends through the nipple. The passage may be provided with threads within the projecting portion 44 to adapt it as a female coupling for the other pipe. A stub portion 48 of the nipple extends into a bore through the pipe 16' to an end which preferably is flush with the interior surface of the pipe 16'. The stub portion 48 thus preferably has a length which corresponds to the thickness of walls of the pipe on which the nipple is mounted.

The nipple at 42 also has a shield 50 which extends radially beyond the portions 44, 48. For example, if the nipple 42 has a round cross section, the shield 50 may also have a round cross section of larger diameter than the cross section of the other nipple portions.

Figure 6:
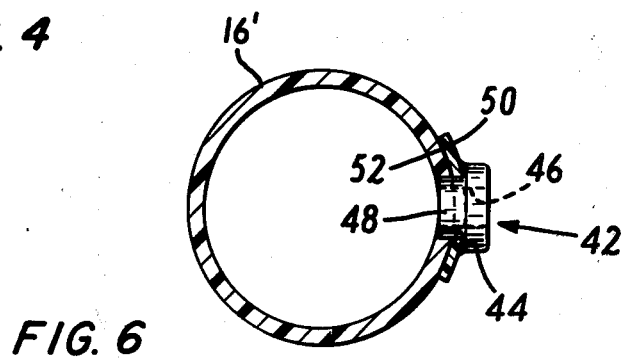
FIG. 6 is an elevation of a portion of the preferred embodiment shown in FIG. 5.

The shield has a surface adapted to conform to the juxtaposed outside surface of the pipe on which the nipple is mounted. For example, as shown in FIG. 6, the shield has surface 52 (FIG. 6) having a curvature corresponding to the exterior curvature of the pipe 16' (FIG. 5). Then, as also shown in FIG. 5, the surface 52 of the shield closely fits against the pipe 16' when the nipple is mounted on the pipe. The nipple 42 is preferably made of PVC, like the pipe 16', for easier selection of a suitable, known adhesive for attaching the nipple to the pipe. The shield surface 52 thus provides a greater area for attachment of the nipple (and a surface conformed to the pipe) than is provided by the other portions of the nipple, thereby assuring better adhesion and sealing of the nipple to the pipe. The shield 50 desirably requires less material than expanding the projecting portion 44 to an area as big as the shield 50. In addition, the shield 50 may be relatively thin to flexibly conform to pipes of various external configurations, for example pipes of different external diameters, whereas the projecting portion must be inflexibly thick for connection to the other pipe.

The invention has been described with reference to one use of the method in replacing a lead (Pb) discharge pipe to a toilet of an existing structure. As earlier described, it is also contemplated that the method is suitable for initially installing a discharge pipe or replacing discharge pipes made from materials other than lead (Pb).

Other modifications of the method or apparatus as may occur to those in the art are contemplated within the scope of the invention in which I claim:

1. In an apparatus for connecting an end of a first pipe to a second pipe intermediate the ends of the second pipe, the second pipe having a bore extending through a wall thereof, including a nipple having a stub portion extending into the bore in the second pipe; a projecting portion extending out of the second pipe and having means for connecting said projecting portion to the end of the first pipe; a passage extending through said stub portion and said projecting portion for forming a flow path between the first pipe and the second pipe; and a shield extending radially beyond said stub portion and said projecting portion and having a surface conformed to a juxtaposed exterior surface of the second pipe for adhesive attachment and sealing thereto, the improvement wherein said shield has a flexibility sufficient to permit it to be selectively conformed to pipes of various external cross sections and wherein said stub portion and said projecting portion are combined to form one piece, the shield constituting a separate piece, whereby different shields can be used selectively with different stub and projecting portion combinations.

2. The improvement as set forth in claim 1, wherein said connecting means is a male threaded connector.

3. The improvement as set forth in claim 1, wherein said connecting means is a female threaded connector.

4. The improvement as set forth in claim 1, wherein the length of said stub portion approximately equals the thickness of the wall of the second pipe, whereby the end of said stub portion is substantially flush with the interior surface of the second pipe.

5. The improvement as set forth in claim 1, wherein said nipple is polyvinylchloride.

6. The improvement as set forth in claim 1, wherein the second pipe is a discharge pipe extending between a toilet and a ferrule projecting from a soil stack.

7. The improvement as set forth in claim 1, wherein said stub portion and said projecting portion are inflexible.

* * * * *